United States Patent [19]

Bryce

[11] 3,999,389
[45] Dec. 28, 1976

[54] SOLAR ENERGY CONVERTER

[76] Inventor: Norman K. Bryce, P.O. Box 685, Pima, Ariz. 85543

[22] Filed: Mar. 31, 1975

[21] Appl. No.: 563,372

[52] U.S. Cl. .................................. 60/641; 126/271
[51] Int. Cl.² .......................................... F03G 7/02
[58] Field of Search ............ 60/641, 675; 126/270, 126/271

[56] References Cited

UNITED STATES PATENTS

| | | | |
|---|---|---|---|
| 1,993,213 | 3/1935 | Gill | 60/641 X |
| 2,141,330 | 12/1938 | Abbot | 126/271 X |
| 2,205,378 | 6/1940 | Abbot | 126/271 |
| 2,460,482 | 1/1949 | Abbot | 126/271 |
| 2,920,710 | 1/1960 | Howard | 60/641 UX |
| 3,348,374 | 10/1967 | Schalkowsky | 60/641 |
| 3,822,692 | 7/1974 | Demarest | 60/641 X |

Primary Examiner—Allen M. Ostrager
Attorney, Agent, or Firm—Warren F. B. Lindsley

[57] ABSTRACT

An improved solar energy collector converter apparatus employing a closed energy conversion cycle utilizing alcohol as the conversion medium and incorporating a solar energy collector which is equipped to follow the sun.

7 Claims, 7 Drawing Figures

SOLAR ENERGY CONVERTER

BACKGROUND OF THE INVENTION

In recent years the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the Middle East countries, for supply. Such a dependence can and does have undesirable effects on the economies of the countries involved and political complications often result. There are also limited sites available that are appropriate for hydroelectric installations.

In the United States there are a number of fossil fuels available such as high-sulphur coal and oil shale, but the development and use of these resources has been complicated by economic and environmental concerns which rule against their use for a number of reasons, including the destructive effects of strip mining, atmospheric contamination due to the high sulphur content of the coal, the cost of extracting the oil from the shale, etc.

More recently, the hope that nuclear power would soon lead to a rapid solution of the energy dilemma has been cooled by delays stemming again from environmental concerns and reservations about the safety of such plants and about the adequacy of plans for handling the radioactive wastes associated with such installations.

In the face of these growing demands and limited resources, there is one source of energy which is readily available to every country in the world in virtually unlimited quantities. This virtually untapped source is solar energy. The World Book Encyclopedia (copyright 1963, USA) states that the amount of solar energy reaching the earth in one day equals the energy that could be produced by burning 550,000,000,000 tons of coal—as much coal as would be dug in the United States in 1,000 years at the 1963 rate of mining. It further states that enough solar energy reaches the United States in 20 minutes to fill the country's entire power needs for one year.

The interest in this almost boundless resource and in its development and harnessing for use in homes and factories is rising as other resources dwindle. Its desirability is further enhanced by the fact that solar energy may be converted to practical use without the hazard of environmental contamination.

PRIOR ART

Until recently the development of solar energy collectors has been associated for the most part with programs involving military and space applications while only limited attention has been given to broad consumer use. As a result, there is a great potential for improvements in existing collection devices that will result in reduced manufacturing cost and improved thermal efficiencies.

One such device known as a flat plate collector is described by the World Book Encyclopedia (copyright 1963). It is made of metal and glass with one or more layers of glass laid over a blackened metal plate. Air spaces are provided between the layers of glass. Air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for a brief period during the day its surface is not perpendicular to the rays of the sun.

A second disadvantage is that the flat plate collector does not permit the concentration of solar energy at a localized point as needed for conversion of water to steam, such conversion being a prerequisite of certain solar-to-electrical conversion processes.

Parabolic reflectors have been utilized in the past along with sun-tracking mechanisms in connection with various schemes for the collection, conversion and utilization of solar energy. Variations of such equipment are described in U.S. Pat. Nos. 495,163 (Apr. 11, 1893); 787,145 (Apr. 11, 1905); 820,127 (May 8, 1906); and 3,713,727 (Jan. 30, 1973). While such prior art inventions do suggest workable approaches for the realization of the important objectives involved, the particular implementations described in these patents have in general fallen short of what is required in a low-cost and practical system suitable for application and use by the typical home-owner.

In the means described in the prior art for the conversion of the solar energy, important aspects of the conversion process have also been neglected. For example, while it is important that operating temperatures be minimized for optimum efficiency and operating life of the equipment, little or no attention has been given to the selection of an appropriate medium such as alcohol with its low boiling temperature. Thus, while U.S. Pat. Nos. 3,029,596; 3,152,774 and 3,266,565 speak in general terms of a fluid medium which is heated by a solar source, they do not specifically call for alcohol or a similar low-temperature fluid.

SUMMARY OF THE INVENTION

In accordance with the invention claimed, an improved solar energy collector and converter apparatus is provided wherein the efficiency and operating life of the converter are optimized through the use of a medium such as alcohol which has a low boiling point.

It is therefore one object of this invention to provide an improved solar energy collector and converter apparatus.

Another object of this invention is to provide such an improved solar energy collector and converter apparatus which is operable at lower levels of available solar energy.

A further object of this invention is to provide such an improved solar energy converter wherein the electrical efficiency and operating life of the equipment are enhanced by virtue of the low operating temperature which is made possible by the use of a low-temperature medium such as alcohol.

A still further object of this invention is to provide such an improved solar energy collector which incorporates a supplementary heating coil for the further extension of the operating range to even lower levels of available solar energy.

Yet another object of this invention is to provide such an improved solar energy collector and converter which is inexpensive in terms of construction and materials so that it may be within the means of the average homeowner.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
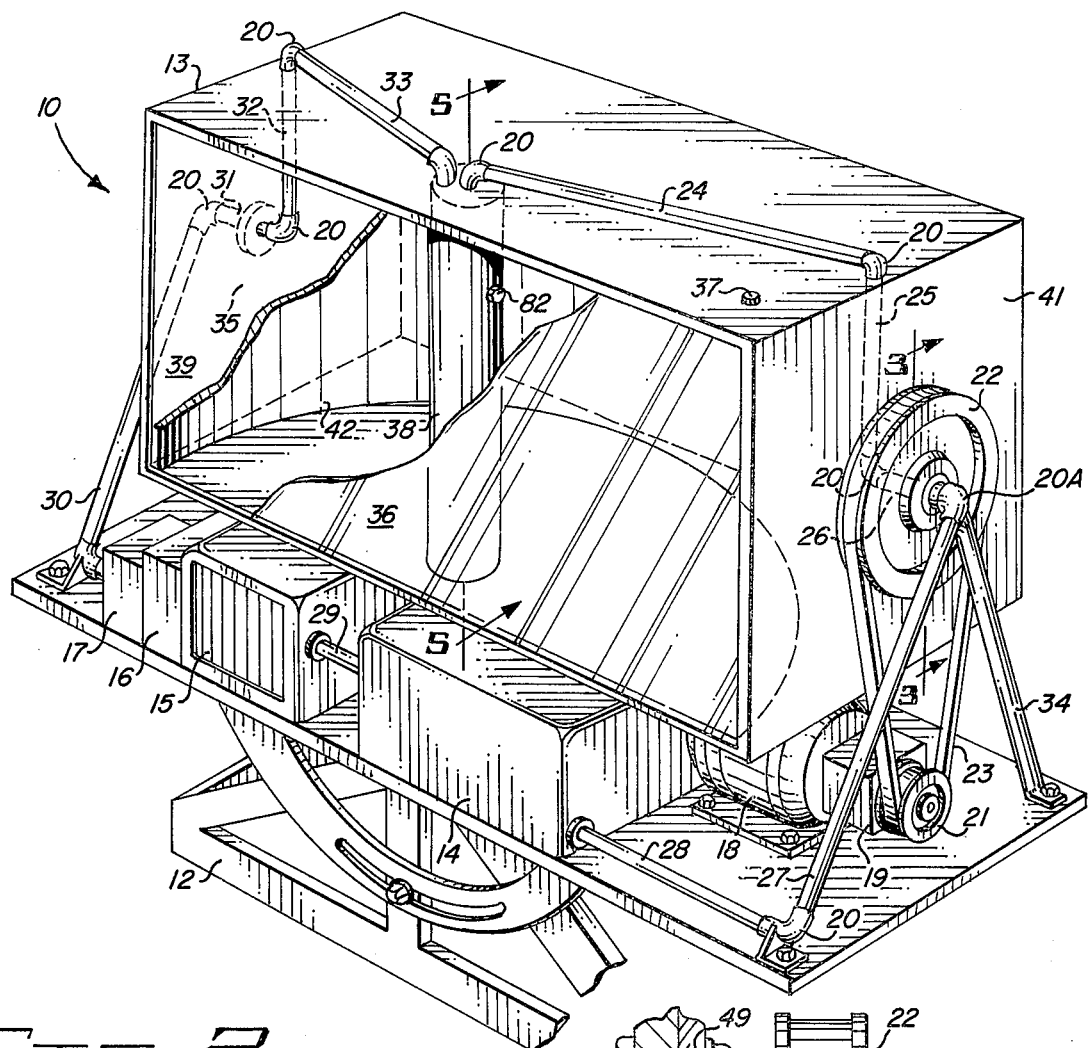
FIG. 1 is a perspective view of the solar energy collector and converter apparatus embodying the invention.

Referring more particularly to the drawing by characters of reference, FIGS. 1-6 disclose an improved solar energy collector and converter apparatus 10 comprising a flat, rectangular mounting platform 11 supported by a tilting base 12 and supporting on its top surface a pivotally mounted collector chamber 13, a turbine 14, condenser 15, reservoir 16, pump 17, and an electric motor 18 and its gear box 19 coupled by means of pulleys 21 and 22 and drive belt 23 to collector chamber 13. Motor 18 tilts collector chamber 13 toward the elevation of the sun during the course of the day. A plurality of steam pipes 24, 25, 26, 27 and 28 are coupled together by means of elbows 20 interconnecting chamber 13 with turbine 14. Steam pipe 29 connects turbine 14 to condenser 15 and fluid transfer pipes 30, 31, 32 and 33 transmit fluid from pump 17 to chamber 13.

Fluid pipe 31 and steam pipe 26 are horizontally mounted and constitute the pivotal axis of collector chamber 13 as it is rotated relative to platform 11. Steam pipe 27, which is diagonally mounted, serves in cooperation with a diagonal brace 34 as a mechanical support for pipe 26, and fluid pipe 30 in cooperation with a diagonal brace 35 serves in a similar fashion at the opposite end of chamber 13 as a support for fluid pipe 31.

Collector chamber 13 is in the form of a rectangular box having its front formed by a glass pane 36 and its remaining five sides constructed of suitable thermally insulating materials, the entire chamber structure preferably hermetically sealed to permit the evacuation of air through a valve 37. Such evacuation is desirable in reducing loss of collected thermal energy to the surrounding atmosphere.

A cylindrical collector element 38 is vertically positioned just behind glass pane 36 and centrally located between end walls 39 and 41 at the focal point of a parabolic reflector 42.

Figure 4:
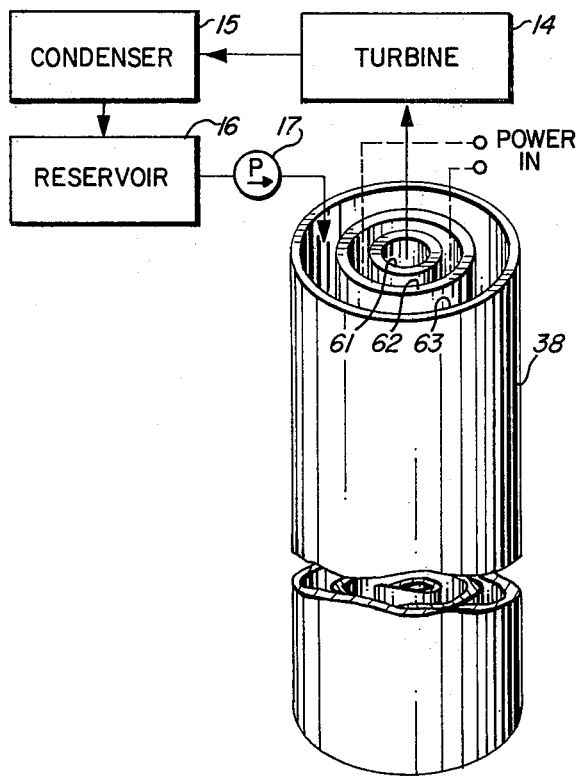
FIG. 4 is a simplified representation of the thermal collector element of the invention shown in functional relationship with other elements of the converter which are represented in block diagram form.
Figure 6:
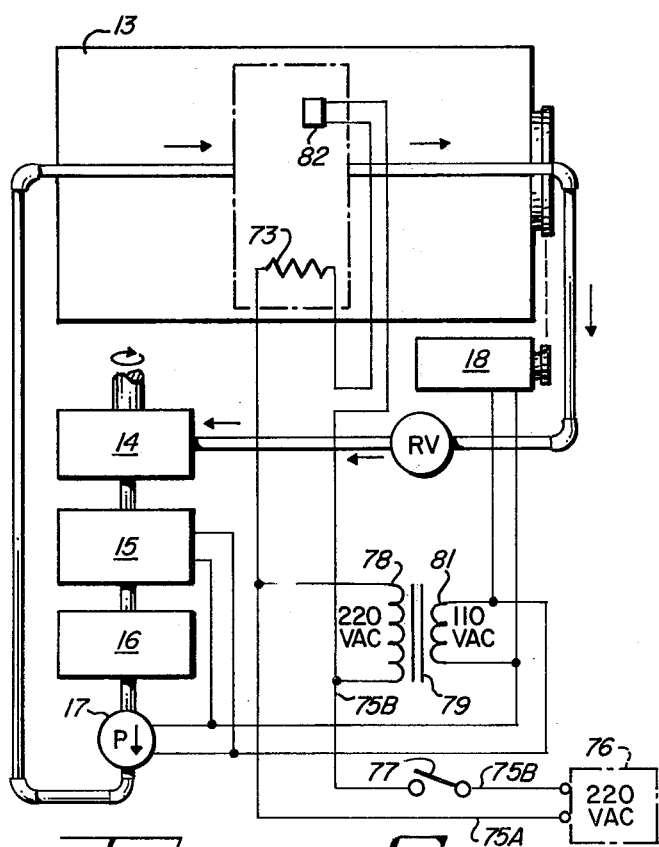
FIG. 6 is a block diagram of the energy conversion system employed in the invention.

The overall operation of the collector and converter systems as illustrated particularly by the apparatus shown in FIGS. 1, 4 and 6 involves a closed system through which a low-temperature medium such as alcohol is circulated. The alcohol enters element 38 as a fluid from pipe 33 and is converted into a gas inside element 38 as it absorbs thermal energy. The generated gas then passes through pipes 24, 25, 26 and 27 and 28 into turbine 14, which converts a major part of the collected thermal energy into mechanical shaft energy and delivers the depleted lower temperature gas via pipe 29 to condenser 15. Condenser 15 further cools the gas and reconverts it to a fluid, said fluid being deposited in reservoir 16. Pump 17 draws the fluid from reservoir for delivery again to collector element 38 via lines 30, 31, 32 and 33.

Figure 3:
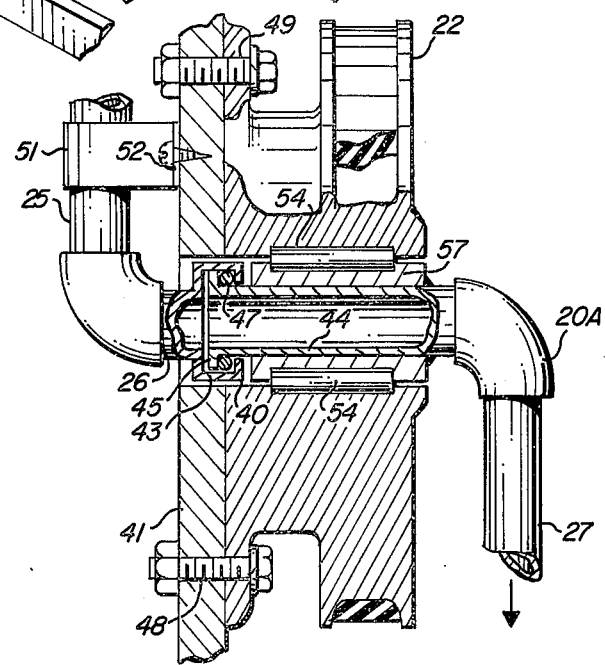
FIG. 3 is a cross-sectional view of a portion of the apparatus of FIGS. 1 and 2 taken along line 3—3 of FIG. 1.

In order to permit the rotation of chamber 13 and pipe 26 relative to platform 11 and to pipe 27, it is necessary to incorporate between pipes 26 and 27 a sealed, rotatable coupling. As illustrated in FIG. 3, this is accomplished by means of a combination of parts inside the hub of pulley 22. These parts include a terminating cup 43 at the end of pipe 26, the brim of which has a lip 40 extending inwardly at right angles to the cylindrical walls of cup 43. A pipe section 44 having a right-angle flange 45 at one end has flange 45 fitted inside cup 43 and its other end fixedly attached by means of elbow 20A to pipe 27. A flexible, high-temperature O-ring 47 is confined between flare 45 and lip 40 with ring 47 permitting rotation of pipe 44 and flare 45 relative to cup 43 and lip 40 but providing a substantially gas-tight seal therebetween. Pulley 22 is fixedly attached to the end wall 41 of chamber 13 by bolts 48 and 49, and pipe 25 is attached to wall 41 by pipe clamp 51 and screws 52.

In order to assure the free rotation of pulley 22 about pipe section 44 under the supported weight of chamber 13, a roller bearing assembly is incorporated in the structure and comprises a support collar 57 fixedly attached to pipe section 44 and a set of roller bearings 54 operating between collar 57 and the cylindrical open center of pulley 22. A similar rotatable coupling is incorporated at the opposite end of chamber 13 between pipes 31 and 32. It is thus apparent that when pulley 21 is turned at a very slow rate through the functioning of gear box 19 and motor 18, pulley 22, by virtue of its coupling through belt 23 to pulley 21, is also turned at a somewhat slower rate because of the relative dimensions of pulleys 21 and 22, and chamber 13 is consequently tilted about its pivotal axis, which is coaxial with pipe 26.

Figure 5:
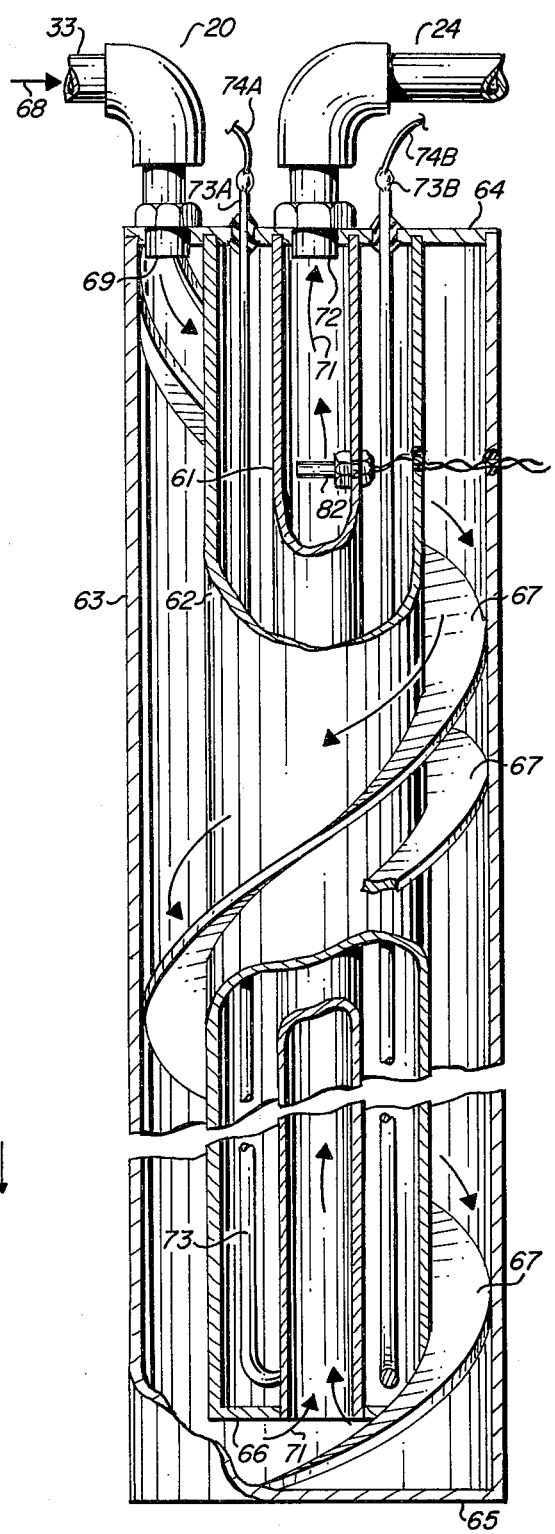
FIG. 5 is a cut-away view of the thermal collector element illustration its inner construction.

The structure of collector element 38 as illustrated in FIGS. 4 and 5 includes three concentric cylinders 61, 62 and 63. All three cylinders are attached and sealed at their upper ends to a top cover plate 64. The outer cylinder 63 is closed at the bottom by a lower end plate 65. The two inner cylinders 61 and 62 are equal in length and somewhat shorter than cylinder 63. A washer-shaped plate 66 is attached to the lower terminations of cylinders 61 and 62 and closes the chamber formed between cylinders 61 and 62 while leaving inner cylinder 61 open at the bottom. Between cylinders 62 and 63 one or more helical vanes 67 are provided as shown in FIG. 5.

In the operation of the collector element 38, condensed alcohol or a similar fluid 68 from pipe 33 enters the upper end of element 38 through a port 69 located in plate 64 between cylinders 62 and 63. The fluid then flows downwardly along the helical vanes 67 and is distributed substantially over the inner surface of cylinder 63 where it rapidly picks up thermal energy from the collected rays of the sun which are focused on the outer surface of cylinder 63 by reflector 42. When the fluid has thus collected a sufficient amount of thermal energy, it is converted to its gaseous state. The generated gas 71 then enters the open lower end of inner cylinder 61 and rises under the high pressure resulting from the fluid-to-gas conversion and is exhausted through port 72 into pipe 24 for delivery to turbine 14.

Inside the cavity or chamber formed between cylinders 61 and 62 is located an electric heater element 73, its upper ends 73A and 73B being connected to electrical conductors 74A and 74B, respectively. A suitable electrically insulating but thermally conductive filler material is packed around element 73 to fill the void between cylinders 61 and 62 and permit the ready conduction of heat between element 73 and cylinder 62.

The function of heater element 73 will now be described with reference to FIG. 6. The electrical circuit shown in FIG. 6 includes power lines 75A and 75B connected to a 220 VAC power source 76, a series POWER-ON switch 77 serially connected in line 75B and controlling power to the primary winding 78 of a step-down transformer 79. The 110 volt secondary winding 81 of transformer 79 is connected to motor 18, to pump 17 and to a blower (not shown) in condenser 15. Serially connected across primary winding 78 are the heater element 73 and a bimetal switch or sensor 82, the sensor 82 being located inside cylinder 61 of collector element 38 where it senses and operates in response to gas temperature. When the gas temperature falls to too low a level, as during periods of reduced solar energy reception, sensor 82 closes its contacts and thereby energizes heater element 73 so that supplemental thermal energy is supplied from source 76 to maintain the operation of turbine 14 through the period of reduced solar energy reception. It is thus evident that a mechanical load connected to turbine 14 may be sustained in operation during such periods including periods of darkness, the solar energy serving to reduce the load on the primary power source 76 when solar energy is available.

While the rotation of chamber 13 relative to platform 11 permits the tracking of the sun's position during a given twenty-four hour period, it is necessary also to compensate for the seasonal changes in the elevation of the sun. The special design of base 12 permits such seasonal adjustments.

Figure 2:
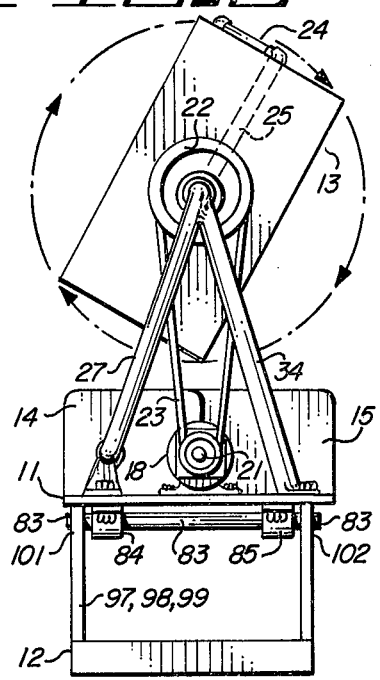
FIG. 2 is a side view of the solar energy collector and converter apparatus of FIG. 1.
Figure 7:
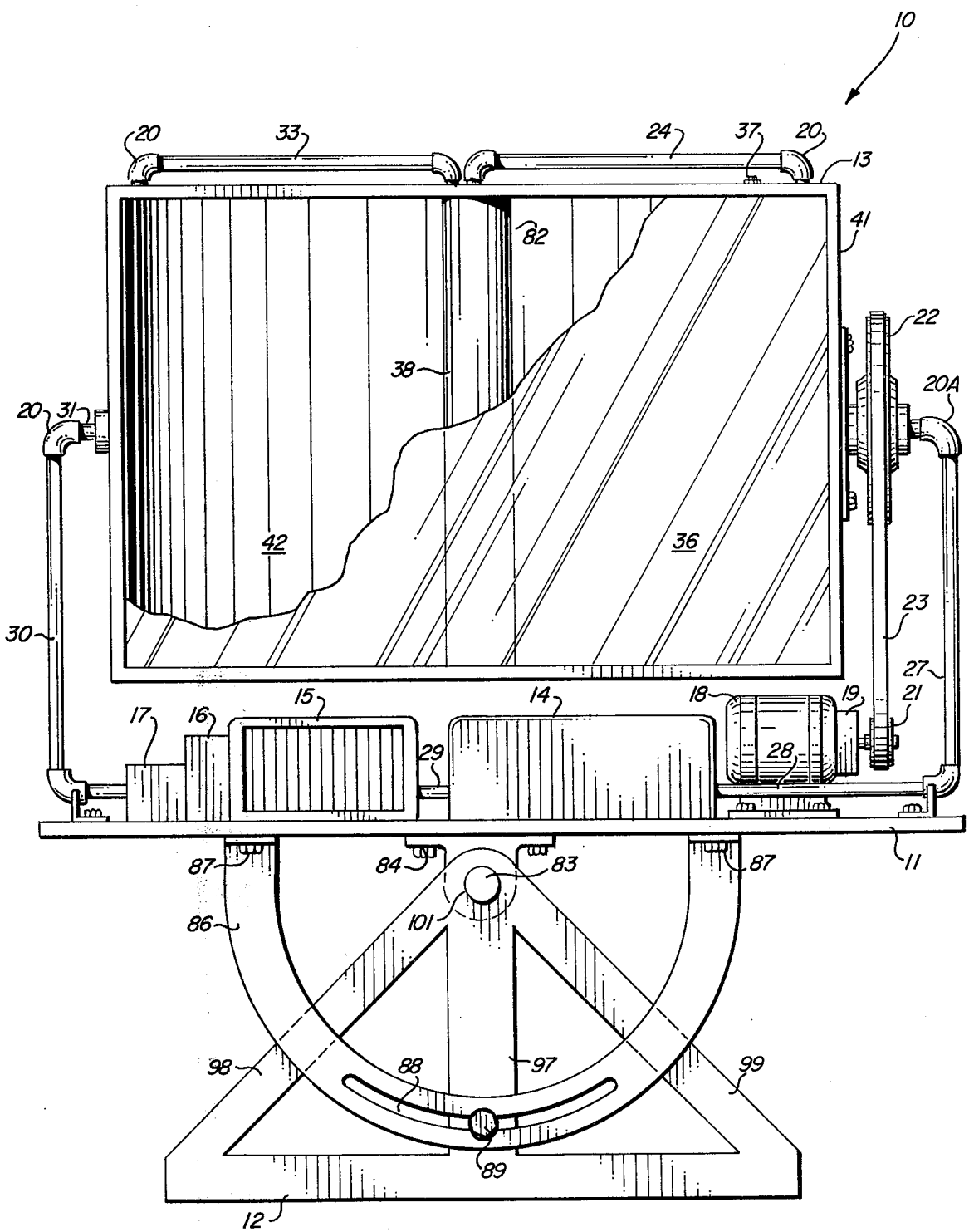
FIG. 7 is a front view of the solar energy collector and converter apparatus showing especially the mechanical mounting structure which permits the solar energy collector to be adjusted for seasonal changes in the elevation of the sun.

As shown in FIGS. 1, 2 and 7, base 12 is in the form of a trestle having a horizontal, rectangular framework which rests on the ground or on a suitable foundation. Rising perpendicularly from the center of the rectangular framework at the front of converter 10 is a vertical support member 97 which is braced by two diagonal member 98 and 99. The vertical and diagonal members converge at the top of the vertical member 97 where a pivotal hub 101 is provided. Identically arranged vertical and diagonal members located at the rear of the rectangular framework support a second hub 102. Passing through hubs 101 and 102 is a pivot bar 83, which is attached to the underside of platform 11 by means of two brackets 84 and 85. A flat, semicircular clamping bracket 86 lying flat against the front surfaces of members 97, 98 and 99 is secured at its open ends to the underside of platform 11 by means of screws or bolts 87. The bracket 86 has a slot 88 running along an arc covering the central portion of the bracket. A clamping screw 89 passes through slot 88 and threads into the lower end of vertical member 97.

When its is desired to make a seasonal adjustment to correct for a change in the elevation of the sun, the clamping screw 89 is loosened, platform 11 is rotated a desired amount about pivot bar 83 and screw 89 is tightened again to secure the platform in the set position. This adjustment can most readily be accomplished at noon or midway between sunrise and sunset, at which time the chamber 13 will have been rotated to a position in which the glass pane 36 is facing upward and is lying parallel with platform 11. Once adjusted in this manner, the steady rotation of chamber 13 about its own axis at a constant rate of one revolution per 24 hours will cause the collector chamber 13 to track the sun throughout the day. Because the seasonal adjustments of base 12 are not a frequent necessity, they may be made manually as described. If preferred, a more elaborate automatic means may be provided.

A complete and self-contained solar energy collector and converter has thus been provided which is capable of driving a mechanical load or of operating an electric generator. In accordance with the objects of the invention, the use of a medium such as alcohol permits efficient operation at a relatively low temperature with the further advantage that the operating range of the converter is extended to lower levels of available solar energy. The incorporation of a means for drawing electrical energy from a public utility source permits continuity of operation even during the night when no solar energy is available. The resulting versatility of the solar energy collector and converter described in this invention constitutes a significant improvement over the present state of the art.

Although but a single embodiment of the invention has been illustrated and described, it will be apparent to those skilled in the art that various changes and modifications may be made therein without departing from the spirit of the invention or from the scope of the appended claims.

What is claimed is:
1. Apparatus for providing continuous operation of an energy converter from an intermittently effective solar heat source comprising in combination:
   a hollow solar energy collector element for converting a liquid to its gaseous state by the application of heat,
   a reflector for focusing solar rays on said collector element,
   an energy converter for converting expanding gas under pressure into mechanical movement,
   a condenser, a first conduit means for transmitting the gas generated by said collector element to said energy converter for expansion and conversion to mechanical movement, a second conduit means for transmitting the expanded gas exhausted by said energy converter to said condenser, a third conduit means for transmitting the gas condensed into its liquid state by said condenser to said collector element, an electrical heating element mounted in said collector element, a source of electrical energy for heating said element, and a sensor mounted in said collector element, said sensor at a predetemined temperature of the gas in said collector energizing said heating element to supplement the heating effects of the solar rays, said hollow solar energy collection element comprising a first hollow cylinder having a coaxially arranged second inner cylinder spaced from the inside walls of said first cylinder and defining a chamber therebetween, said third conduit means being connected to deliver the gas in its liquid state to said chamber, means for directing said gas in the liquid state lengthwise along the collecting element in one direction whereby the liquid is converted to its gaseous state, said second inner cylinder receiving the thus converted gas and directing it through the inner cylinder in an opposite direction along the length of the collecting element, said first conduit means being connected to receive the gas after its flow through said inner cylinder.

2. The apparatus set forth in claim 1 wherein:
said reflector comprises a parabolic reflector.

3. The apparatus set forth in claim 1 in further combination with:
means for turning said relfector and said energy converter for optimum exposure to solar rays.

4. The apparatus set forth in claim 1 in further combination with:
frame means comprising bearing structures for pivotally mounting said collector element and said reflector for 360° rotation about its axis, and
a means for changing the position of said collector element and said reflector to conform to the diurnal path of the sun.

5. The apparatus set forth in claim 1 in further combination with:
frame means comprising bearing structures for pivotally mounting said collector element and said reflector for 360° rotation about its axis,
a first means for changing the position of said collector element and said reflector to conform to the diurnal path of the sun, and
a second means for pivotally mounting said frame means for predetermined pivotal movement laterally to its movement by said first means to compensate for seasonal positions of the sun,
said bearing structures each comprising a conduit means for passing through the bearing structure the liquid to be transmitted to and from said collector element.

6. The apparatus set forth in claim 1 wherein:
said fluid comprises alcohol.

7. The apparatus set forth in claim 1 wherein:
said means for directing includes vanes within said chamber for directing the fluid passing through it in a spiral path.

* * * * *